(12) United States Patent
Carlson et al.

(10) Patent No.: US 7,721,496 B2
(45) Date of Patent: May 25, 2010

(54) COMPOSITE DECKING MATERIAL AND METHODS ASSOCIATED WITH THE SAME

(75) Inventors: Barry Carlson, Windsor, CO (US); Jason Underhill, Fort Collins, CO (US)

(73) Assignee: Tac Technologies, LLC, Fort Collins, CO (US)

( * ) Notice: Subject to any disclaimer, the term of this patent is extended or adjusted under 35 U.S.C. 154(b) by 185 days.

(21) Appl. No.: 11/777,930

(22) Filed: Jul. 13, 2007

(65) Prior Publication Data

US 2007/0289234 A1 Dec. 20, 2007

Related U.S. Application Data

(63) Continuation-in-part of application No. 11/675,587, filed on Feb. 15, 2007, which is a continuation-in-part of application No. 11/194,973, filed on Aug. 2, 2005, now Pat. No. 7,213,379.

(60) Provisional application No. 60/598,014, filed on Aug. 2, 2004, provisional application No. 60/644,451, filed on Jan. 14, 2005, provisional application No. 60/686,870, filed on Jun. 1, 2005, provisional application No. 60/774,105, filed on Feb. 15, 2006, provisional application No. 60/791,301, filed on Apr. 12, 2006, provisional application No. 60/822,048, filed on Aug. 10, 2006, provisional application No. 60/807,294, filed on Jul. 13, 2006, provisional application No. 60/822,048, filed on Aug. 10, 2006.

(51) Int. Cl.
*E04C 1/00* (2006.01)

(52) U.S. Cl. .................. 52/309.16; 52/177; 52/483.1; 52/843; 52/745.19; 29/458; 29/897.3; 428/188; 428/319.7; 264/34; 264/271.1

(58) Field of Classification Search .................. 52/177, 52/307.7, 309.16, 483.1, 834, 843, 309.8, 52/309.9, 794.1, 325, 421, 577, 576, 783.1, 52/FOR. 134, 745.19; 428/411.1, 412, 161, 428/172, 188, 319.3, 319.7; 264/34, 271.1; 403/234; 29/458, 527.2, 897.3, 897.312

See application file for complete search history.

(56) References Cited

U.S. PATENT DOCUMENTS 526,730 A * 10/1894 Norcross ..................... 52/241

(Continued)

OTHER PUBLICATIONS

U.S. Appl. No. 11/675,587, filed Feb. 15, 2007, Carlson et al.

(Continued)

*Primary Examiner*—Robert J Canfield
*Assistant Examiner*—Matthew J Gitlin
(74) *Attorney, Agent, or Firm*—Cochran Freund & Young LLC (57) ABSTRACT

A construction member includes a composite material offering strength and functionality. Embodiments of the present invention include a thermoplastic composite for use in applications such as decking, exterior siding, seating and furniture. In one embodiment, a structural member includes a glass-reinforced PVC core surrounded by a thermoplastic layer that further includes a thermoplastic with elastomer thermo-foamed layer as a exterior layer. All three components can be extruded and bond together to form a composite material that offers appropriate structural strength with resistance to heating from sunlight.

23 Claims, 8 Drawing Sheets

U.S. PATENT DOCUMENTS

| | | | |
|---|---|---|---|
| 1,006,423 A * | 10/1911 | Asher | 52/324 |
| 1,422,579 A * | 7/1922 | Kent | 264/160 |
| 1,860,205 A | 5/1932 | Schenker | |
| 2,751,775 A * | 6/1956 | Sergovic | 428/78 |
| 3,195,699 A * | 7/1965 | Johnston | 52/364 |
| 3,217,659 A | 11/1965 | Ford, Jr. | |
| 3,228,162 A * | 1/1966 | Gregoire | 52/309.9 |
| 3,239,982 A * | 3/1966 | Nicosia | 52/309.7 |
| 3,263,387 A | 8/1966 | Simpson | |
| 3,267,627 A | 8/1966 | Hammitt | |
| 3,283,464 A | 11/1966 | Litzka | |
| 3,284,971 A | 11/1966 | Attwood | |
| 3,286,413 A | 11/1966 | Wells | |
| 3,295,267 A | 1/1967 | Lundell | |
| 3,300,931 A | 1/1967 | Lütze | |
| 3,301,741 A * | 1/1967 | Danielson et al. | 428/41.5 |
| 3,307,312 A * | 3/1967 | Kreibaum | 52/302.3 |
| 3,328,931 A | 7/1967 | Smith | |
| 3,368,016 A | 2/1968 | Birguer | |
| 3,394,507 A | 7/1968 | Doke | |
| 3,427,773 A | 2/1969 | Kandall | |
| 3,442,542 A | 5/1969 | Watanabe | |
| 3,487,518 A | 1/1970 | Hopfeld | |
| 3,507,738 A * | 4/1970 | Prusinski et al. | 428/71 |
| 3,511,743 A * | 5/1970 | Rach | 428/136 |
| 3,516,213 A * | 6/1970 | Sauer | 52/834 |
| 3,577,504 A | 5/1971 | Lipski | |
| 3,583,123 A * | 6/1971 | Holmgren et al. | 52/588.1 |
| 3,590,547 A | 7/1971 | Molyneux | |
| 3,617,364 A * | 11/1971 | Jarema et al. | 428/307.3 |
| 3,654,018 A * | 4/1972 | Bogue et al. | 156/245 |
| 3,707,401 A * | 12/1972 | Jarema et al. | 428/312.2 |
| 3,708,380 A * | 1/1973 | Niebylski | 428/71 |
| 3,715,846 A * | 2/1973 | Sullhofer | 52/309.9 |
| 3,716,957 A | 2/1973 | Bernardi | |
| 3,716,959 A | 2/1973 | Bernardi | |
| 3,732,654 A | 5/1973 | Tsurumi | |
| 3,753,326 A * | 8/1973 | Kaufman, Sr. | 52/845 |
| 3,798,867 A | 3/1974 | Starling | |
| 3,810,363 A | 5/1974 | Dar Conte | |
| 3,845,544 A | 11/1974 | Nurminen et al. | |
| 3,866,372 A | 2/1975 | Haage | |
| 3,877,193 A | 4/1975 | Hall | |
| 3,896,199 A * | 7/1975 | Michaelis | 264/46.5 |
| 3,908,327 A | 9/1975 | Quigg | |
| 3,913,290 A | 10/1975 | Billing et al. | |
| 3,946,529 A * | 3/1976 | Chevaux | 150/105 |
| 3,946,533 A | 3/1976 | Raugh et al. | |
| 3,947,309 A | 3/1976 | Troutner | |
| 3,963,552 A | 6/1976 | Troutner et al. | |
| 3,979,870 A * | 9/1976 | Moore | 52/577 |
| D242,625 S | 12/1976 | Schmidt | |
| D242,799 S | 12/1976 | Schmidt | |
| 4,012,883 A | 3/1977 | Muller | |
| 4,014,201 A | 3/1977 | Troutner et al. | |
| 4,019,301 A * | 4/1977 | Fox | 52/834 |
| 4,033,166 A | 7/1977 | Troutner | |
| 4,047,341 A | 9/1977 | Bernardi | |
| 4,081,941 A | 4/1978 | Van Ausdall | |
| 4,122,203 A * | 10/1978 | Stahl | 428/318.4 |
| 4,129,974 A | 12/1978 | Ojalvo | |
| 4,132,577 A * | 1/1979 | Wintermantel | 156/156 |
| 4,141,944 A * | 2/1979 | Anstadt et al. | 264/45.5 |
| 4,147,379 A | 4/1979 | Winslow | |
| 4,177,306 A | 12/1979 | Schulz et al. | |
| 4,196,558 A | 4/1980 | Jungbluth | |
| 4,213,281 A * | 7/1980 | Zarzosa-Castilla et al. | 52/323 |
| 4,219,980 A | 9/1980 | Loyd | |
| 4,251,973 A | 2/1981 | Paik | |
| 4,291,081 A | 9/1981 | Olez | |
| 4,297,825 A | 11/1981 | Harper, Jr. | |
| 4,302,913 A | 12/1981 | Schwartz et al. | |
| 4,320,162 A * | 3/1982 | Schulz | 428/154 |
| 4,333,289 A | 6/1982 | Strickland | |
| 4,355,754 A | 10/1982 | Lund et al. | |
| 4,364,213 A * | 12/1982 | Biesanz, Sr. | 52/309.17 |
| 4,407,106 A | 10/1983 | Beck | |
| 4,424,652 A | 1/1984 | Turner | |
| 4,429,872 A | 2/1984 | Capachi | |
| 4,453,363 A | 6/1984 | Koller | |
| 4,492,063 A * | 1/1985 | Schock et al. | 52/309.7 |
| 4,505,082 A * | 3/1985 | Schmitz | 52/309.8 |
| 4,512,835 A | 4/1985 | Gardiner | |
| 4,527,372 A | 7/1985 | Ryan | |
| 4,566,231 A | 1/1986 | Konsevich | |
| 4,569,875 A * | 2/1986 | Pohlmann et al. | 428/119 |
| 4,571,913 A | 2/1986 | Schleich et al. | |
| 4,576,849 A | 3/1986 | Gardiner | |
| 4,579,658 A * | 4/1986 | Moller | 210/483 |
| 4,587,774 A | 5/1986 | Wendt | |
| 4,607,470 A | 8/1986 | Ecker | |
| 4,616,464 A | 10/1986 | Schleich et al. | |
| 4,616,960 A | 10/1986 | Gladish | |
| 4,621,475 A | 11/1986 | McClain | |
| 4,630,546 A | 12/1986 | Wiger et al. | |
| 4,630,547 A | 12/1986 | Przybylinski et al. | |
| 4,630,548 A | 12/1986 | Wiger et al. | |
| 4,646,493 A | 3/1987 | Grossman | |
| 4,647,489 A * | 3/1987 | Siol et al. | 428/119 |
| 4,695,501 A * | 9/1987 | Robinson | 428/159 |
| 4,704,830 A | 11/1987 | Magadini | |
| 4,738,058 A * | 4/1988 | Svensson | 52/98 |
| 4,774,794 A * | 10/1988 | Grieb | 52/309.7 |
| 4,779,395 A | 10/1988 | Schleich et al. | |
| 4,785,599 A | 11/1988 | Murphy | |
| 4,811,542 A | 3/1989 | Jewell | |
| 4,831,800 A | 5/1989 | Nedelcu | |
| 4,835,026 A * | 5/1989 | Horiki et al. | 428/40.6 |
| 4,848,054 A | 7/1989 | Blitzer et al. | |
| 4,887,406 A | 12/1989 | Saia | |
| 4,891,081 A * | 1/1990 | Takahashi et al. | 156/78 |
| 4,894,898 A | 1/1990 | Walker | |
| 4,953,339 A | 9/1990 | Jewell | |
| 4,996,812 A * | 3/1991 | Venable | 52/408 |
| 5,021,281 A | 6/1991 | Bompard et al. | |
| 5,022,209 A | 6/1991 | Kimura | |
| 5,052,164 A | 10/1991 | Sandow | |
| 5,052,307 A | 10/1991 | Morrison | |
| 5,066,440 A * | 11/1991 | Kennedy et al. | 264/69 |
| 5,095,674 A * | 3/1992 | Huettemann | 52/405.3 |
| 5,096,525 A | 3/1992 | Engwall | |
| 5,119,614 A | 6/1992 | Rex | |
| 5,125,207 A | 6/1992 | Strobl, Jr. et al. | |
| 5,148,642 A | 9/1992 | Plumier et al. | |
| 5,207,045 A | 5/1993 | Bodnar | |
| 5,230,190 A | 7/1993 | Schuette | |
| 5,233,807 A | 8/1993 | Spera | |
| 5,238,716 A * | 8/1993 | Adachi | 428/34.7 |
| 5,268,226 A * | 12/1993 | Sweeney | 428/312.4 |
| 5,279,093 A | 1/1994 | Mead | |
| 5,285,616 A | 2/1994 | Tripp | |
| 5,294,468 A * | 3/1994 | Chang | 428/35.8 |
| 5,295,334 A | 3/1994 | Haraden | |
| 5,308,675 A | 5/1994 | Crane et al. | |
| 5,313,749 A | 5/1994 | Conner | |
| 5,321,926 A * | 6/1994 | Kennedy | 52/405.1 |
| 5,373,674 A * | 12/1994 | Winter, IV | 52/309.9 |
| 5,396,748 A | 3/1995 | Rogers | |
| 5,398,470 A * | 3/1995 | Ritter et al. | 52/309.11 |
| 5,412,913 A | 5/1995 | Daniels et al. | |
| 5,414,969 A | 5/1995 | Krejci et al. | |
| 5,421,132 A | 6/1995 | Bischel et al. | |
| 5,437,303 A | 8/1995 | Johnson | |
| 5,455,100 A * | 10/1995 | White | 428/131 |

| Patent | Date | Name | Class |
|---|---|---|---|
| 5,471,809 A * | 12/1995 | Frankel | 52/834 |
| 5,501,053 A | 3/1996 | Goleby | |
| 5,509,250 A | 4/1996 | Jensen et al. | |
| 5,511,355 A | 4/1996 | Dingler | |
| 5,518,208 A | 5/1996 | Roseburg | |
| 5,524,410 A | 6/1996 | Menchetti | |
| 5,535,569 A | 7/1996 | Seccombe et al. | |
| 5,537,789 A * | 7/1996 | Minke et al. | 52/313 |
| 5,553,437 A | 9/1996 | Navon | |
| 5,588,273 A | 12/1996 | Csagoly | |
| 5,595,040 A | 1/1997 | Chen | |
| 5,600,930 A * | 2/1997 | Drucker | 52/585.1 |
| 5,600,932 A | 2/1997 | Paik et al. | |
| 5,612,111 A * | 3/1997 | Lin | 428/71 |
| 5,636,492 A | 6/1997 | Dingler | |
| 5,658,644 A * | 8/1997 | Ho et al. | 428/188 |
| 5,671,573 A | 9/1997 | Tadros et al. | |
| 5,680,738 A | 10/1997 | Allen et al. | |
| 5,681,641 A | 10/1997 | Grigsby et al. | |
| 5,749,199 A | 5/1998 | Allen | |
| 5,749,256 A | 5/1998 | Bodnar | |
| 5,817,397 A * | 10/1998 | Kamiya et al. | 428/141 |
| 5,829,716 A | 11/1998 | Kirkwood et al. | |
| 5,845,447 A | 12/1998 | Bodine et al. | |
| 5,848,512 A | 12/1998 | Conn | |
| 5,895,419 A | 4/1999 | Tweden et al. | |
| 5,913,784 A * | 6/1999 | Hite | 52/177 |
| 5,913,794 A | 6/1999 | Chen | |
| 5,914,175 A * | 6/1999 | Nudo et al. | 428/178 |
| 5,924,261 A | 7/1999 | Fricke | |
| 5,930,966 A | 8/1999 | Wood et al. | |
| 5,930,968 A | 8/1999 | Pullam | |
| 5,950,377 A * | 9/1999 | Yoder | 52/177 |
| 5,953,880 A * | 9/1999 | De Zen | 405/257 |
| 5,968,444 A * | 10/1999 | Yamamoto | 264/519 |
| 5,974,760 A | 11/1999 | Tingley | |
| 5,985,435 A * | 11/1999 | Czaplicki et al. | 428/323 |
| 5,996,672 A * | 12/1999 | Kotin | 160/236 |
| 6,012,256 A | 1/2000 | Aschheim | |
| 6,023,903 A | 2/2000 | Stecker | |
| 6,041,566 A | 3/2000 | Allen | |
| 6,058,673 A | 5/2000 | Wycech | |
| 6,060,144 A * | 5/2000 | Kimura et al. | 428/91 |
| 6,067,770 A | 5/2000 | Lubker, II et al. | |
| 6,073,420 A | 6/2000 | Bjøru et al. | |
| 6,082,073 A | 7/2000 | Silvanus et al. | |
| 6,115,986 A | 9/2000 | Kelly | |
| 6,122,884 A | 9/2000 | Talwar | |
| 6,128,884 A | 10/2000 | Berdan, II et al. | |
| 6,131,362 A | 10/2000 | Buecker | |
| 6,138,432 A * | 10/2000 | Banicevic | 52/784.15 |
| 6,161,361 A | 12/2000 | Ehrenkrantz | |
| 6,170,217 B1 | 1/2001 | Meyer | |
| 6,173,550 B1 | 1/2001 | Tingley | |
| 6,209,282 B1 | 4/2001 | Lafrance | |
| 6,212,846 B1 | 4/2001 | Johnston | |
| 6,216,404 B1 | 4/2001 | Vellrath | |
| 6,219,990 B1 | 4/2001 | Snyder et al. | |
| 6,233,892 B1 * | 5/2001 | Tylman | 52/309.12 |
| 6,237,302 B1 | 5/2001 | Fricke | |
| 6,237,303 B1 | 5/2001 | Allen et al. | |
| 6,269,598 B1 * | 8/2001 | Wintermantel | 52/220.1 |
| 6,280,667 B1 * | 8/2001 | Koenig et al. | 264/68 |
| 6,296,224 B1 * | 10/2001 | Hayakawa | 249/47 |
| 6,301,857 B1 | 10/2001 | Vrana | |
| 6,318,029 B1 | 11/2001 | Huppunen | |
| D451,612 S * | 12/2001 | Thibault et al. | D25/119 |
| 6,330,778 B1 | 12/2001 | Jakobsson | |
| 6,332,301 B1 | 12/2001 | Goldzak | |
| 6,341,467 B1 | 1/2002 | Wycech | |
| 6,343,453 B1 | 2/2002 | Wright | |
| 6,344,268 B1 * | 2/2002 | Stucky et al. | 428/317.9 |
| 6,370,833 B1 | 4/2002 | Rastegar | |
| 6,374,555 B1 * | 4/2002 | Gusler | 52/177 |
| 6,391,456 B1 | 5/2002 | Krishnaswamy et al. | |
| 6,408,591 B1 | 6/2002 | Yamashita et al. | |
| 6,415,562 B1 * | 7/2002 | Donaghue et al. | 52/177 |
| 6,415,576 B1 * | 7/2002 | Stromback | 52/719 |
| 6,418,686 B1 * | 7/2002 | Record | 52/309.15 |
| 6,446,414 B1 | 9/2002 | Bullard, III et al. | |
| 6,451,231 B1 * | 9/2002 | Harrison et al. | 264/45.3 |
| 6,460,309 B1 | 10/2002 | Schneider | |
| 6,460,310 B1 | 10/2002 | Ford et al. | |
| 6,475,577 B1 | 11/2002 | Hopton et al. | |
| 6,484,997 B1 | 11/2002 | Edwards et al. | |
| 6,497,080 B1 | 12/2002 | Malcolm | |
| 6,516,583 B1 | 2/2003 | Houghton | |
| 6,519,911 B1 * | 2/2003 | Sawada | 52/842 |
| 6,526,723 B2 | 3/2003 | Hovenier | |
| 6,532,713 B2 | 3/2003 | Katayama et al. | |
| 6,550,211 B2 | 4/2003 | Kergen | |
| 6,555,214 B1 * | 4/2003 | Yates | 428/314.4 |
| 6,561,571 B1 | 5/2003 | Brennecke | |
| 6,561,736 B1 | 5/2003 | Doleshal | |
| 6,612,085 B2 | 9/2003 | Edwards | |
| 6,615,559 B2 | 9/2003 | McGrath et al. | |
| 6,616,997 B1 * | 9/2003 | Lauer et al. | 428/36.5 |
| 6,619,502 B2 | 9/2003 | Walther et al. | |
| 6,634,155 B2 | 10/2003 | Smith | |
| 6,672,026 B2 | 1/2004 | Sumerak | |
| 6,684,596 B2 | 2/2004 | Rastegar | |
| 6,701,690 B2 * | 3/2004 | Deschenes | 52/837 |
| 6,708,459 B2 | 3/2004 | Bodnar | |
| 6,739,106 B2 * | 5/2004 | Curatolo | 52/592.1 |
| 6,749,709 B1 | 6/2004 | Krishnawswamy et al. | |
| 6,755,003 B1 | 6/2004 | McGrath et al. | |
| 6,790,520 B1 * | 9/2004 | Todd et al. | 428/318.4 |
| 6,826,884 B2 | 12/2004 | Pabedinskas et al. | |
| 6,844,040 B2 | 1/2005 | Pabedinskas et al. | |
| 6,858,276 B1 * | 2/2005 | Chomier et al. | 428/35.7 |
| 6,860,079 B2 * | 3/2005 | Schwarz | 52/786.1 |
| 6,890,637 B2 * | 5/2005 | Baker | 428/297.4 |
| 6,958,185 B1 * | 10/2005 | Zehner | 428/317.9 |
| 7,041,361 B2 * | 5/2006 | Thomsen et al. | 428/178 |
| 7,169,460 B1 * | 1/2007 | Chen et al. | 428/195.1 |
| 7,533,500 B2 * | 5/2009 | Morton et al. | 52/177 |
| 2002/0146541 A1 * | 10/2002 | Fried | 428/172 |
| 2003/0059577 A1 * | 3/2003 | Morrison et al. | 428/166 |
| 2004/0045847 A1 | 3/2004 | Fairbank | |
| 2004/0062922 A1 * | 4/2004 | Sunde | 428/319.3 |
| 2004/0137212 A1 * | 7/2004 | Ochoa et al. | 428/319.3 |
| 2004/0250503 A1 | 12/2004 | Bigelow | |
| 2004/0265568 A1 * | 12/2004 | Crane | 428/318.6 |
| 2005/0108983 A1 | 5/2005 | Simko et al. | |
| 2005/0221057 A1 * | 10/2005 | Hollis et al. | 428/172 |
| 2006/0032182 A1 | 2/2006 | Carlson et al. | |
| 2006/0035069 A1 * | 2/2006 | Hanai | 428/316.6 |
| 2007/0141282 A1 * | 6/2007 | Chang et al. | 428/35.2 |
| 2007/0281133 A1 * | 12/2007 | Smith et al. | 428/161 |

OTHER PUBLICATIONS

U.S. Appl. No. 11/696,122, filed Apr. 3, 2007, Carlson et al.
U.S. Appl. No. 11/696,629, filed Apr. 4, 2007, Carlson et al.
Non-final Office Action, mailed Mar. 9, 2009, in U.S. Appl. No. 11/696,629, filed Apr. 4, 2007, by Barry Carlson, et al.
Non-final Office Action, mailed Nov. 21, 2006, in U.S. Appl. No. 11/194,793, filed Aug. 2, 2005, by Barry Carlson et al.
"TJI Joist Specifier's Guide #2027;" True Joist; Feb. 2005; 23 pp.
"Kubota Research and DuPont-Toray Develop Breakthrough Fiber Reinforced Thermoplastic Composite; RuBA®-C;" Kubota Research Associates, Inc.; Press Release Sep. 28, 2005, 2 pages.
"PE Materials," Plastics Engineering, Apr. 2005, p. 6-13.

"A New Approach to Joining & Manufacturing Advanced Materials . . . From a New Company . . . With a New Perspective!" Kubota Research Associates, Inc., available at http://www.kubotaresearch.com/index.html, 2005, 2 pages.

PCT Written Opinion of the International Searching Authority for International Application No. PCT/US05/27522, mailing date: Jan. 29, 2007.

PCT International Preliminary Report on Patentability for International Application No. PCT/US05/27522, mailed Apr. 19, 2007.

PCT International Search Report for International Application No. PCT/US05/27522, mailing date: Jan. 29, 2007.

Leaversuch "Close-Up on Technology—Welding New Approach to IR Welding Bonds Mor Engineering Plastics;" Plastics Technology Online, available at http://www.plasticstechnology.com/articles/200404cu5.html, Apr. 2004, 2 pages.

* cited by examiner

COMPOSITE DECKING MATERIAL AND METHODS ASSOCIATED WITH THE SAME

CROSS REFERENCE TO RELATED APPLICATIONS

The present application is a continuation-in-part application of U.S. patent application Ser. No. 11/675,587 filed Feb. 15, 2007, which is a continuation-in-part application of U.S. patent application Ser. No. 11/194,973 filed Aug. 2, 2005, now U.S. Pat. No. 7,213,379, which claimed the benefit of U.S. Provisional Application No. 60/598,014 filed on Aug. 2, 2004, U.S. Provisional Application No. 60/644,451 filed on Jan. 14, 2005, and U.S. Provisional Application No. 60/686,870 filed on Jun. 1, 2005; in addition, U.S. patent application Ser. No. 11/675,587 filed Feb. 15, 2007 claimed the benefit of U.S. Provisional Application No. 60/774,105 filed on Feb. 15, 2006, U.S. Provisional Application No. 60/791,301 filed on Apr. 12, 2006, and U.S. Provisional Application No. 60/822,048 filed on Aug. 10, 2006; in addition, the current application also claims the benefit of U.S. Provisional Application No. 60/807,294 filed on Jul. 13, 2006, and U.S. Provisional Application No. 60/822,048 filed on Aug. 10, 2006. The entire disclosures of the above-referenced patent applications are incorporated herein by reference in their entirety.

FIELD OF THE INVENTION

The present invention is directed to a construction material, and more particularly, to a material for use in decking or to form other surfaces, as well as methods of manufacturing and using the material.

BACKGROUND OF THE INVENTION

Various materials have previously been used to form decking surfaces, including natural materials such as wood, as well as synthetic materials, such as plastic. Although wood is often used, in many weather climates it requires maintenance that owners find burdensome and/or expensive. This has resulted in the increased use of other materials to avoid such up-keep, including plastic decking.

Although some plastic decking offers the advantage of less maintenance and up-keep, one problem associated with plastic decking materials is that the material can undergo relatively significant amounts of thermal expansion and contraction, which can be expressed in the form of warping. In addition to being unsightly, warped decking can pose a serious tripping hazard.

Both wood and plastic decking materials can also become too hot to be traversed by people that are not wearing shoes or other footwear. Since decking is used for outdoor all-weather surfaces, it is often placed in and around gathering places where people are occupied with outdoor activities, and many times, such activities are preferably undertaken by people in their bare feet. As people commonly know, it is often painful to walk on exposed outdoor decking because it is too hot.

With regard to artificial deck planking, some non-wood decking materials include multiple pieces that are assembled to form a single plank. For example, a top is snapped on to a base. Among other things, for these configurations the construction step requires assembling the pieces that can be more time consuming than installing a plank that is a single integral member.

Accordingly, among other things, it would be advantageous to provide a decking material that requires relatively less maintenance and up-keep than does natural wood decking. In addition, it would advantageous to provide a decking material that does not detrimentally warp and that maintains an acceptable surface temperature for traversing in one's bare feet. Furthermore, it would be advantageous to provide a decking material that is made in standardized construction dimensions for ease of use. It would also be advantageous to provide a planking material that is a single integral unit and does not require assembly. Finally, it would be advantageous to provide a construction material that has application for a number of different uses, including outdoor furniture, exterior siding for buildings, play sets, railings, and/or any other surface potentially contacting skin or otherwise needing to maintain an acceptable temperature upon exposure to the sun.

Nothing herein is to be construed as an admission that the present invention is not entitled to antedate a patent, publication or invention by another by virtue of prior invention.

SUMMARY

It is to be understood that the present invention includes a variety of different versions or embodiments, and this Summary is not meant to be limiting or all-inclusive. This Summary provides some general descriptions of some of the embodiments, but may also include some more specific descriptions of certain embodiments.

Embodiments of the present invention include synthetic construction/decking materials, as well as methods of using and manufacturing such materials. In one embodiment of the present invention, a synthetic decking is provided, wherein the decking includes a plurality of material types for providing both a relatively light-weight and easy-handling material that further provides an exposed upper layer or top surface that is relatively resistant to excessive heating by exposure to the sun. Embodiments of the present invention may also include a reinforcing member.

At least some embodiments comprise an inner core that is at least partially surrounded by an outer core. Overlying the top of the outer core is a surface material. All three components can be extruded and bond together to form a composite plank or decking material that is stronger than wood, provides more resistance to heat on the surface, and provides a comfortable walking surface.

The inner core portion of the planks described herein may comprise different materials. For example, the inner core may comprise aluminum, steel, or a metal alloy such as an aluminum alloy, or it may comprise another structurally reinforcing material, such as carbon fiber or glass-reinforced polyurethane. The glass-reinforced polyurethane may be foamed to reduce its weight and to provide other advantageous engineering properties. The inner core may be solid, or alternatively, it may comprise void spaces and/or one or more hollow portions. Thus, embodiments of the present invention include a variety of material types and configurations. By way of example and not limitation, an embodiment may comprise a first material forming the inner core with a second material filling the first material. For example, the inner core may comprise a hollow aluminum or aluminum alloy reinforcing member, or the inner core may be filled with another material, such as a foam. In at least one embodiment of the present invention, the inner core may comprise a hollow (or substantially hollow) glass-reinforced polyurethane structure. In at least one embodiment of the present invention, the inner core may comprise a hollow foamed or unfoamed glass-reinforced polyurethane material. In at least one embodiment of the present invention, the inner core may comprise a solid (or substantially solid) member, such as a foamed or an unfoamed glass-reinforced polyurethane material. The inner core may also comprise a metal, a metal alloy, steel, aluminum, an aluminum alloy, glass-reinforced polyurethane, carbon fiber, foamed and unfoamed glass-reinforced polyurethane, and combinations thereof.

Combining a thermoplastic with a metal alloy, such as an aluminum alloy, steel, carbon fiber, or glass-reinforced polyurethane in the configurations shown and described herein provides functionality by increasing loading strength. Under compression or tension, the integral configuration of the inner and outer cores resist movement, thereby improving load ratings. The material types and/or structural features of the planking components of embodiments of the present invention provide structurally sound members with other attractive features, such as weight reduction and heat dissipation characteristics.

One aspect of the present invention is to provide a plank that can be used for a variety of construction projects. Thus, a plank for use in a deck or boardwalk is provided, the plank comprising:

a structural core comprising an inner core having an exterior surface that is at least substantially surrounded and at least partially in contact with an outer core wherein the outer core is placed in contact with the inner core in a molten state, the outer core made of a thermoplastic material, the inner core comprising at least one of:
  (a) a plurality of saddles situated along the exterior surface of the inner core, the saddles including a neck portion having a neck width that is smaller than a maximum base portion width of a base portion of the saddles, wherein at least a portion of the thermoplastic material of the outer core is located within the saddles and contacting an inner surface of the saddles; and
  (b) a plurality of hollow portions located within an inner space of the inner core, at least two of the hollow portions separated by a post in cross-sectional view.

The plank may also optionally include a surface material located on an at least an upper surface of the structural core, the surface material comprising a thermoplastic comprising an elastomer and thermofoaming, the surface material further comprising at least one of:
  (a) a foaming agent; and
  (b) a plurality of microspheres of a polymer shell encapsulated glass; wherein the surface material and the structural core comprise a single integral piece.

In another aspect of the present invention, a decking material for use in construction projects is provided, the decking material comprising:

a structural core having a first end, a second end and extending a longitudinal length L;

an exterior layer or wearing surface located on at least an upper surface of the structural core and extending the longitudinal length L, the partial exterior layer comprising a thermoplastic comprising an elastomer and thermofoaming; and wherein the structural core and the partial exterior layer or wearing surface comprise a single integral piece that is bonded together, and not mechanically or frictionally interconnected.

Embodiments of the present invention are also directed to a planking material for use in a structure. Thus, a planking is provided, comprising:
  (a) a reinforcing member comprising a first end and a second end and extending along a longitudinal length L between the first and second ends, an exterior surface of the reinforcing member comprising an undulating shape;
  (b) a thermoplastic outer layer substantially surrounding and at least partially contacting the exterior surface of the reinforcing member along the longitudinal length L, wherein the thermoplastic outer layer occupies recessed areas of the undulating shape;
  (c) a surface layer comprising a resin and a foaming agent, the surface layer bonded to a portion of the thermoplastic outer layer, and not mechanically or frictionally interconnected to the thermoplastic outer layer; and
  wherein the thermoplastic outer layer is placed around the exterior surface of the reinforcing member by forming the thermoplastic outer layer around the reinforcing member in a molten state.

In at least one embodiment of the invention, the planking the thermoplastic outer layer comprises between 20 to 40 percent by weight talc. In addition, the reinforcing member comprises a metal alloy. Also, the reinforcing member may comprise one or more interior hollow areas. In addition, the exterior surface of the reinforcing member may comprise one or more of a deboss and a surface texturing. For various embodiments of the invention, the planking material may be used in a structure, wherein the structure comprises at least one of a deck, a building, a portion of a piece of furniture, and a sitting surface.

Embodiments of the present invention further include methods of using and manufacturing the planking or structural members described herein. The surfacing material, outer core and inner core can all be manufactured by an extrusion process. The surfacing material, outer core and inner core bond in the profile to form a composite material that demonstrates strength properties necessary for decking planks, boardwalks, railings, table tops, counter tops, and other applications. For the surfacing material, foaming agents or microspheres comprising a polymer shell encapsulating glass can be added during the extrusion manufacturing process.

For an inner core comprising glass-reinforced polyurethane, liquid or molten glass is added to the tooling downstream of the extruded polyurethane (PUR) to blend the two materials together. This blended material may comprise the inner core of the various the planks described herein, and, for example, can serve as metal alloy core replacement. The glass-reinforced polyurethane is then fed through a die (e.g., a cross-head die) to be at least partially covered with a resin, comprising, for example, HDPE or PPE, with or without fillers of calcium carbonate or talc. During the manufacturing process, the glass-reinforced polyurethane may be foamed, such as by air entrainment, to provide a lighter weight inner core. In certain embodiments of the invention, the extruded aluminum, other alloy component, glass-reinforced polyurethane, or carbon fiber inner core may comprise an outer surface that includes a configuration for enhanced bonding between itself and the thermoplastic. This may include scarification of the surface, projections on the surface, divots in the surface, apertures in the surface, application of bonding tape, provision of ribs or other non-flat surface features, or the like, to provide a bonding and adhesion surface for the thermoplastic. Improved bonding between the aluminum and thermoplastic can improve the strength of the final product. Although still available, scarification may not be necessary for certain core materials, such as glass-reinforced polyurethane.

Thus, another aspect of the invention is to provide a method of manufacturing planking members, the method comprising:
  (a) forming an inner core from a first material, the inner core having at least one of:

(i) a plurality of saddles wherein the saddles comprise a neck portion comprising a narrower width than an inner portion of the saddles; and (ii) a hollow portion; and (b) placing an outer core at least partially around the inner core, the placing including contacting a molten thermoplastic material of the outer core with an exterior surface of the inner core. The method may further comprise contacting a partial exterior layer or wearing surface made of a thermoplastic with elastomer and thermofoaming to at least one exterior surface of the outer core, wherein the inner core, outer core, and the partial exterior layer or wearing surface comprise a single integral piece that is bonded together, and not mechanically or frictionally interconnected.

Embodiments of the present invention may comprise any one or more of the novel features described herein, including in the Detailed Description, and/or shown in the drawings.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

Various embodiments of the present invention are set forth in the attached figures and in the detailed description of the invention as provided herein and as embodied by the claims. It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

Additional advantages of the present invention will become readily apparent from the following discussion, particularly when taken together with the accompanying drawings.

BRIEF DESCRIPTION OF THE DRAWINGS

The drawings are not necessarily to scale, and may, in part, include exaggerated dimensions for clarity.

DETAILED DESCRIPTION OF THE INVENTION

A synthetic construction/decking material is provided, such as a thermoplastic composite building material with increased strength and functionality. In at least one embodiment of the invention, the material comprises a structural core with a exterior layer or wearing surface having suitable properties for a walking surface. Other applications of the present invention include use of the composite profile for handrails, seating surfaces, and furniture surfaces, etc.

Figure 1:
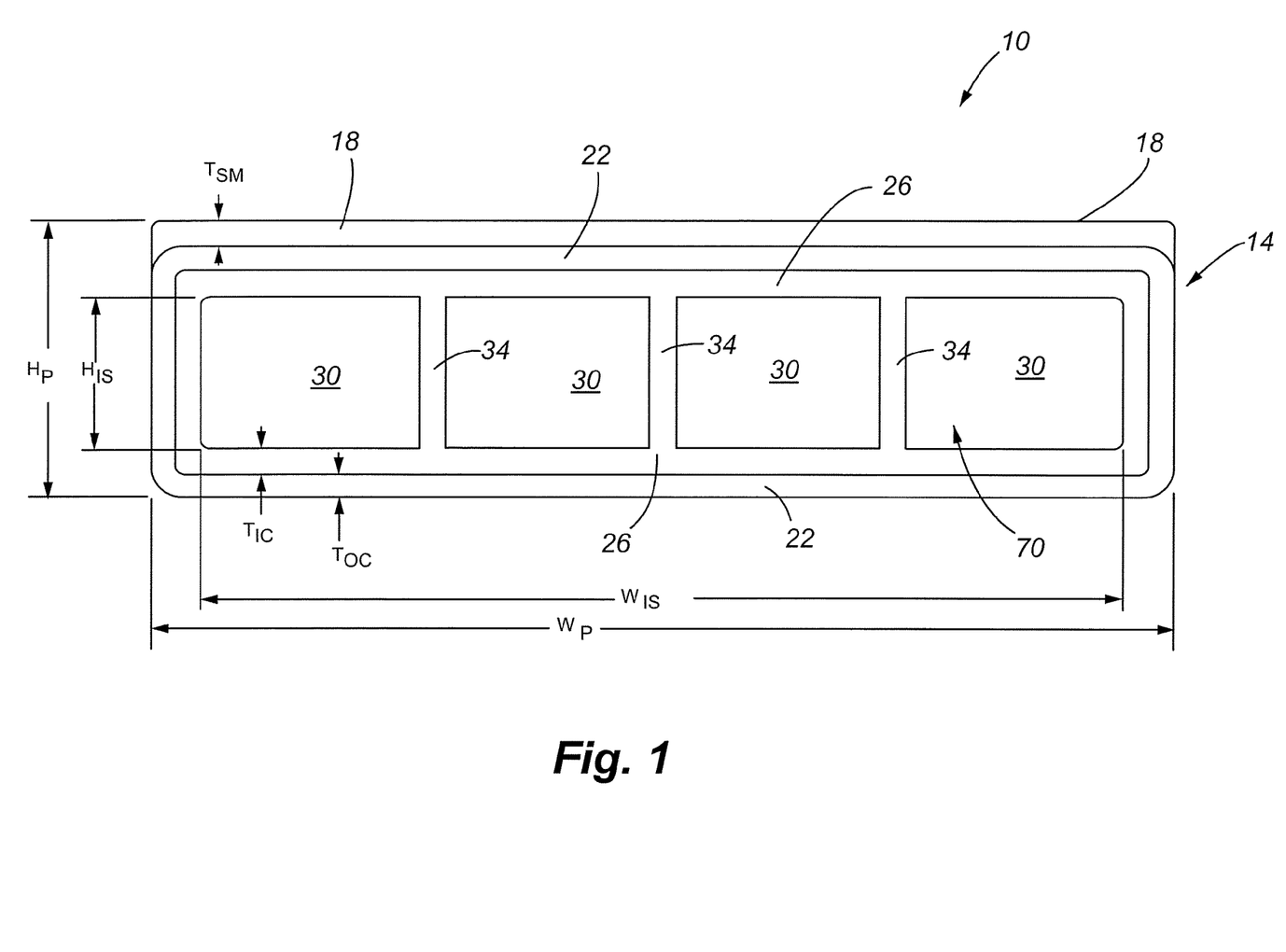
FIG. 1 is a side elevation view of an end of a plank in accordance with an embodiment of the present invention.

One embodiment of the present invention comprises a construction member that, among other things, has application for use as deck planking. Referring now to FIG. 1, a side elevation view of an end of a plank 10 in accordance with an embodiment of the present invention is shown. The plank 10 comprises a structural core 14, at least a portion of which is overlain with a surfacing material 18.

The surfacing material 18 preferably provides a comfortable walking surface with resistance to heating from sunlight. By way of example and not limitation, the surfacing material 18 is a thermofoamed thermoplastic with an elastomer. The foaming is provided by foaming agents, or otherwise by microspheres that include a polymer shell encapsulating glass. Thus, as those skilled in the art will appreciate, a variety of foaming agents exist, and such foaming agents may be used to form the surfacing material 18 or thermofoamed layer. The foamed layer may include, but is not limited to, a thermoplastic with expand cells, and thermoplastic elastomers also known as "TPEs."

In addition to providing a comfortable walking surface with respect to temperature, the thermofoamed surfacing material 18 also provides some cushioning as compared to wood decking or non-thermofoamed plastic surfaces. The surfacing material 18 is preferably a light color, such as ivory or white so that it reflects sunlight and remains cooler than a darker color, such as shades typically associated with natural wood, or stained and/or chemically treated wood. However, as those skilled in the art will appreciate, since the surface material is synthetic, a variety of colors are possible, including light or dark colors with or without the appearance of simulated wood grain finishes in terms of one or more of color and texture. Furthermore, darker colors may be desirable for use at certain construction projects where heat uptake is desired, such as decking at ski resorts.

In accordance with at least one embodiment of the present invention, the structural core 14 of the plank 10 comprises a first material situated within a second material. More particularly, as shown in FIG. 1, the structural core 14 includes an outer core 22 at least partially surrounding an inner core 26. For the example shown in FIG. 1, both the outer core 22 and the inner core 26 have a substantially rectangular shape. However, other shapes are within the scope of the invention. For example, the outer core 22 may surround a plurality of inner core members (not shown), wherein the plurality of inner core members have a rectangular shape, square shape, circular shape, lobed shape, or other shape, or combinations thereof.

In accordance with embodiments of the present invention, the inner core 26 preferably includes a shape that reduces the weight of the plank 10, thereby making the plank 10 less expensive, cheaper to transport, and easier to handle during construction of a structure, such as an outdoor deck or boardwalk. Accordingly, the inner core 26 preferably includes one or more indentations, recesses and/or void spaces. For the embodiment shown in FIG. 1, the inner core 26 includes a plurality of hollow portions 30. In at least one embodiment, adjacent hollow portions 30 are separated by a post 34. The hollow portions 30 preferably extend the longitudinal length of the plank 10, thereby providing a built-in void space that serves as a convenient installation access route for wiring and/or other materials, such as a piping conduit, cable access, etc.

In accordance with embodiments of the present invention, one or more of the hollow portions 30 itself may serve as piping for conveying a fluid. By way of example and not limitation, water may be conveyed through one or more of the hollow portions to heat or cool the decking material. Alternatively, a gas (e.g., warm or cool air) or different type of fluid may be used. The fluid may be used to cool the decking, or alternatively, the fluid may be used to heat the decking to prevent the accumulation of snow and/or ice on the upper surface of the decking.

Figure 2:
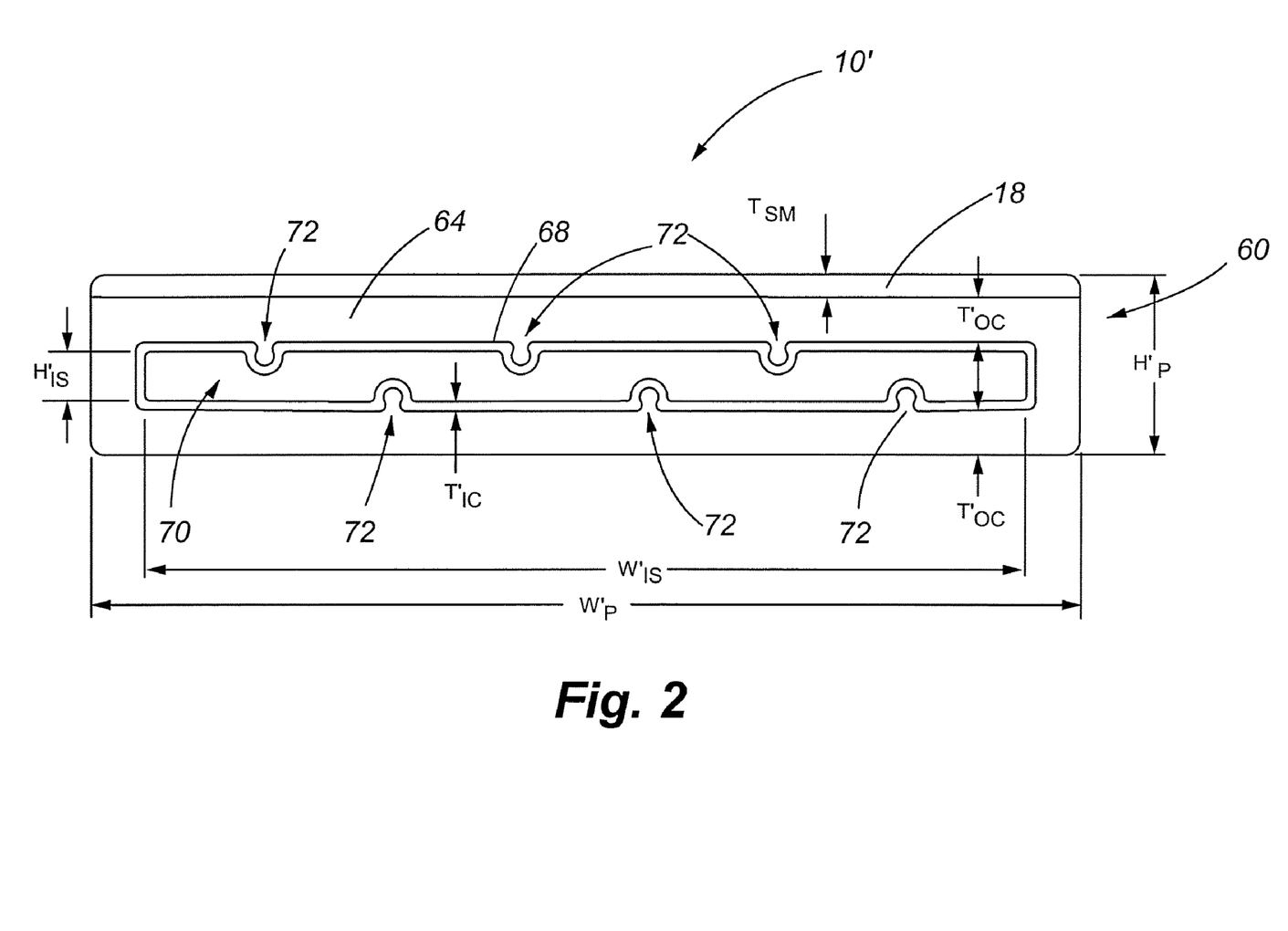
FIG. 2 is a side elevation view of an end of another plank in accordance with an embodiment of the present invention.

Referring now to FIG. 2, a modified version of the present invention is shown as plank 10'. Similar to plank 10, plank 10' includes a structural core 60 that comprises an outer core 64 that at least partially surrounds an inner core 68. In at least one embodiment, the inner core 68 includes an inner space 70, where the inner space 70 may comprise one or more hollow portions 30. Alternatively, the inner space 70 may be filled with another material, such as a foam.

The inner core 68 of plank 10' includes at least one, and more preferably, a plurality saddles 72. The saddles 72 comprise a geometry that improves mechanical bonding between the outer core 64 and the inner core 68. More particularly, and with reference to FIG. 3, the saddles 72 include recesses within the inner core 68, wherein the saddles 72 have a neck portion 76 having a narrower neck width $W_{Neck}$ than a maximum base portion width $W_{MBP}$ of base portion 80 of the saddle 72. That is, in at least one embodiment, $W_{MBP} > W_{Neck}$.

Figure 3:
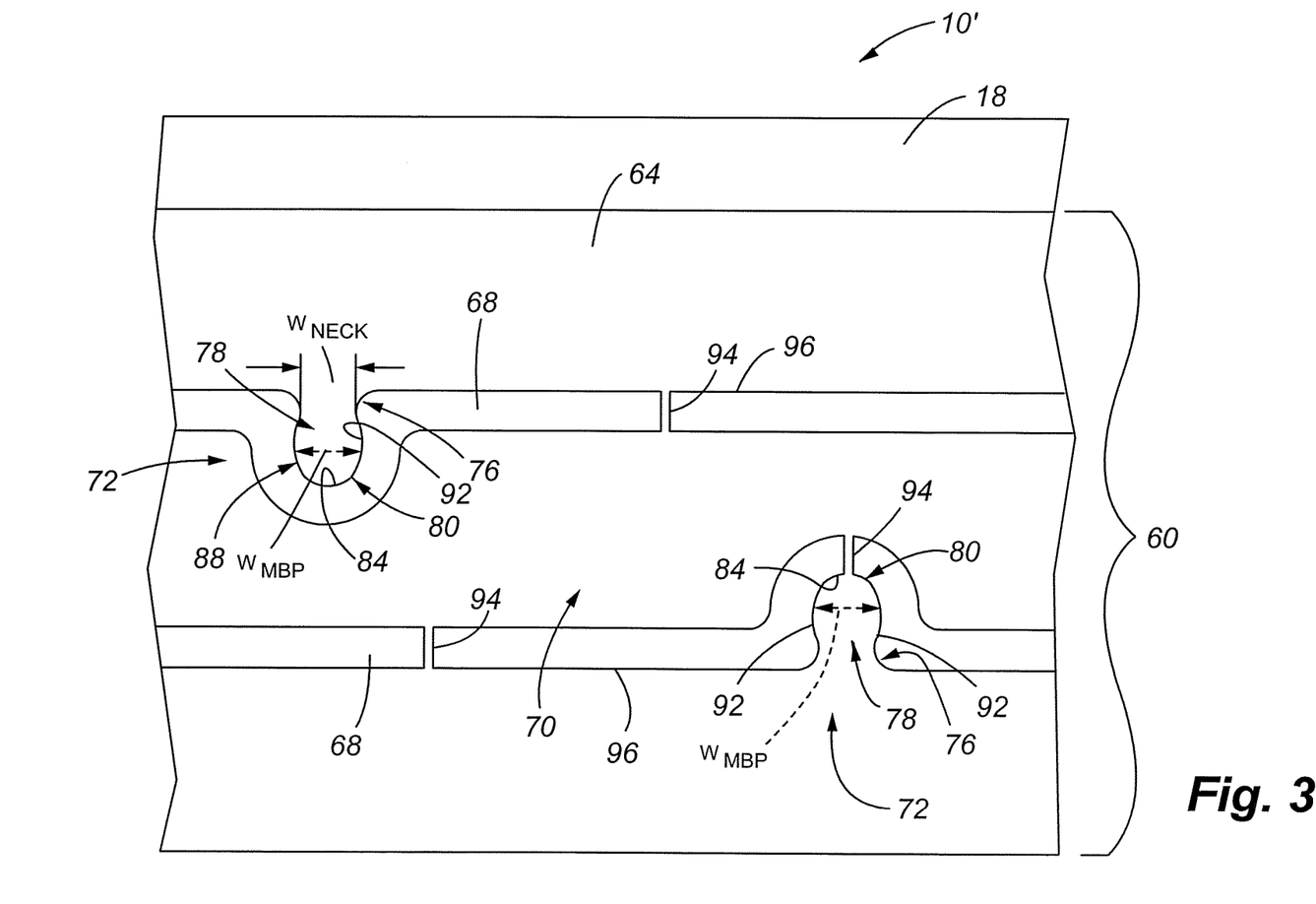
FIG. 3 is an enlarged side elevation detail view of a portion of the plank shown in FIG. 2.

The saddles 72 shown in FIG. 3 generally comprise a rounded base portion 80. In at least one embodiment of the invention, the inner surface 84 of the base portion 80 comprises a semicircular shape 88 in cross section, wherein $W_{MBP}$ represents the diameter of the semicircular shape 88. The tapered sides 92 of the saddle 72 extend between the neck portion 76 and the location of the maximum base portion width $W_{MBP}$. By providing a saddle 72 within the inner core 68, the material forming the outer core 64 flows into the saddle 72 during extruding or injection molding of the outer core 64 over the inner core 68. The structure of the saddle 72 in combination with the saddle fill material 78 then provides improved mechanical bonding between the outer core 64 and the inner core 68 because the saddle fill material 78 cannot easily pull out of the saddle due to the anchoring influence of the wider saddle fill material 78 relative to the neck portion 76.

Referring still to FIG. 3, in accordance with at least one embodiment of the invention, the saddle 72 may optionally include one or more perforations or apertures 94 between the base portion 80 of the saddle 72 leading to the inner space 70 of the inner core 68. The apertures 94 serve allow the molten thermoplastic material of the outer core 64 to more easily move into the saddle 72 by allow air or gas within the saddle 72 to move into the inner space 70 of the inner core 68 as the molten thermoplastic material of the outer core is introduced in contact with the exterior surface 96 of the inner core 68. The apertures 94 also serve to further mechanically anchor the thermoplastic material of the outer core 64 to the inner core 68.

Figure 4A:
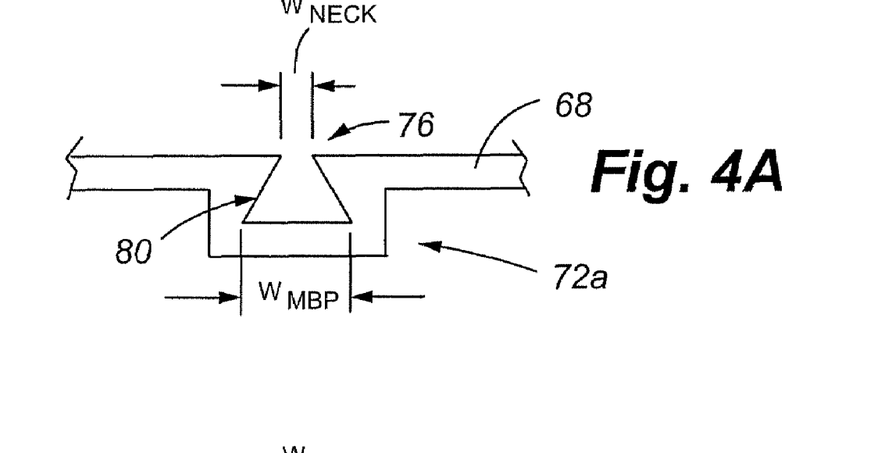
FIGS. 4A-4C are detail views alternative saddles to those shown in FIG. 3.
Figure 4B:
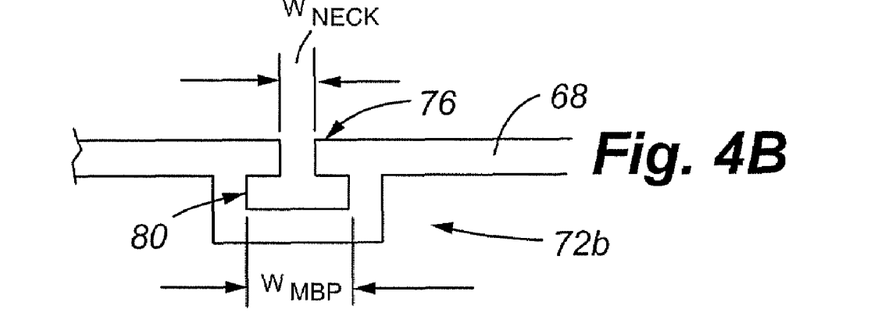
Figure 4C:
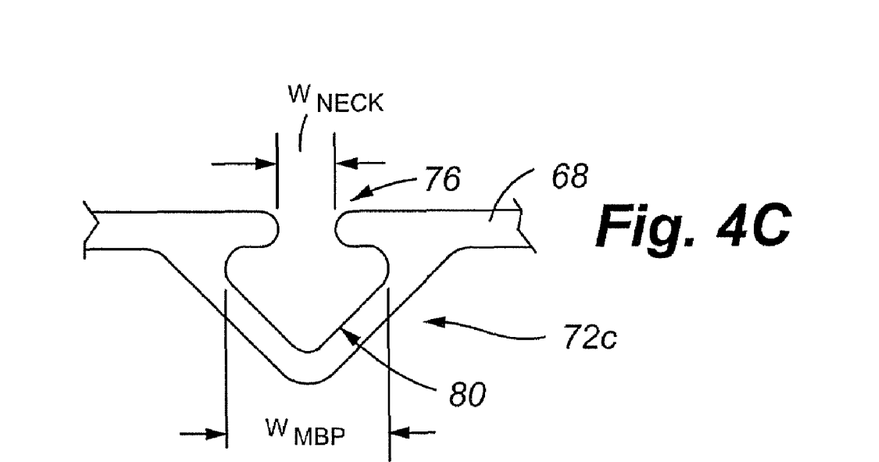

Referring now to FIGS. 4A-4C, and by way of example and not limitation, several alternate configurations for saddles 72 are shown. In FIG. 4A, saddle 72a is shown that comprises a substantially trapezoid-shaped recess. In FIG. 4B, saddle 72b is shown in that comprises a substantially T-shaped (or inverted T-shaped) recess. In FIG. 4C, saddle 72c is shown that comprises a substantially arrowhead-shaped recess. For all of the saddles 72a-c shown in FIGS. 4A-4C, the width of the neck width $W_{Neck}$ is less than the maximum base portion width $W_{MBP}$. As those skilled in the art will appreciate, a variety of different shapes, geometries and/or configurations are possible for the saddles, and such variations are within the scope of the present invention.

With regard to the plank 10, 10' embodiments described above, the planks 10, 10' are preferably a single integral member. That is, the walking surface is not snapped on to the structural core 14, 60. Advantageously, the inner core 26, 68, the outer core 22, 64 and the surfacing material 18 are a single piece. Accordingly, each of the planks 10, 10' are installed as one piece over support joists or other underlying structure.

Figure 5:
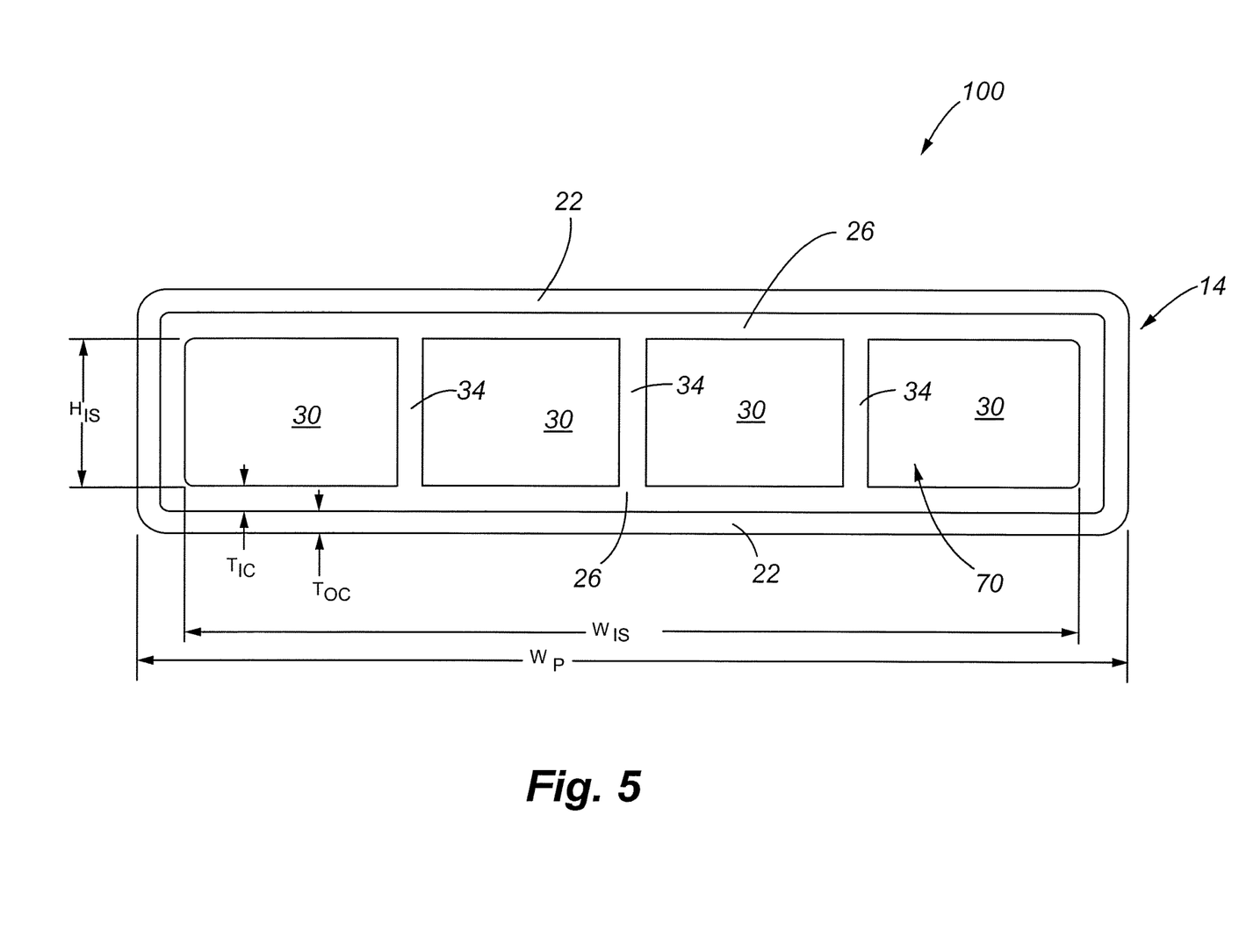
FIG. 5 is a side elevation view of an end of a plank in accordance with an embodiment of the present invention.
Figure 6:
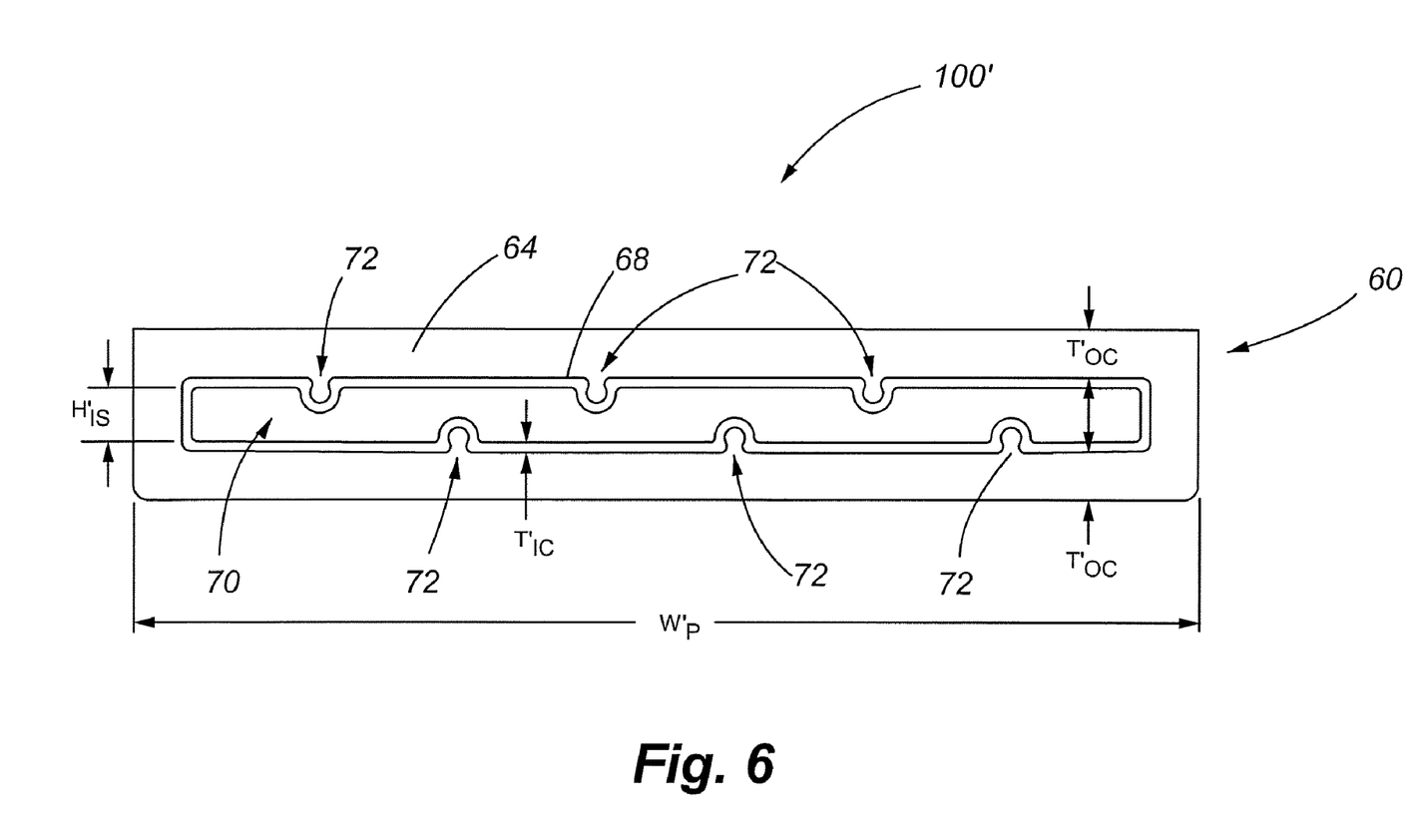
FIG. 6 is a side elevation view of an end of another plank in accordance with an embodiment of the present invention.

Referring now to FIG. 5, a plank 100 is shown, wherein the plank 100 comprises structural core 14 including inner core 26 and outer core 22. However, the plank 100 does not include surfacing material 18. Similarly, and with reference to FIG. 6, plank 100' is shown, wherein the plank 100' comprises structural core 60 including inner core 68 and outer core 64. However, the plank 100' does not include surfacing material 18. Accordingly, it is to be understood that the surfacing material 18 is optional. For example, planks 10, 10' may be desirable for decking projects around pools, and planks 100, 100' may be desirable for boardwalks or decks at ski resorts.

Figures 7, 8:
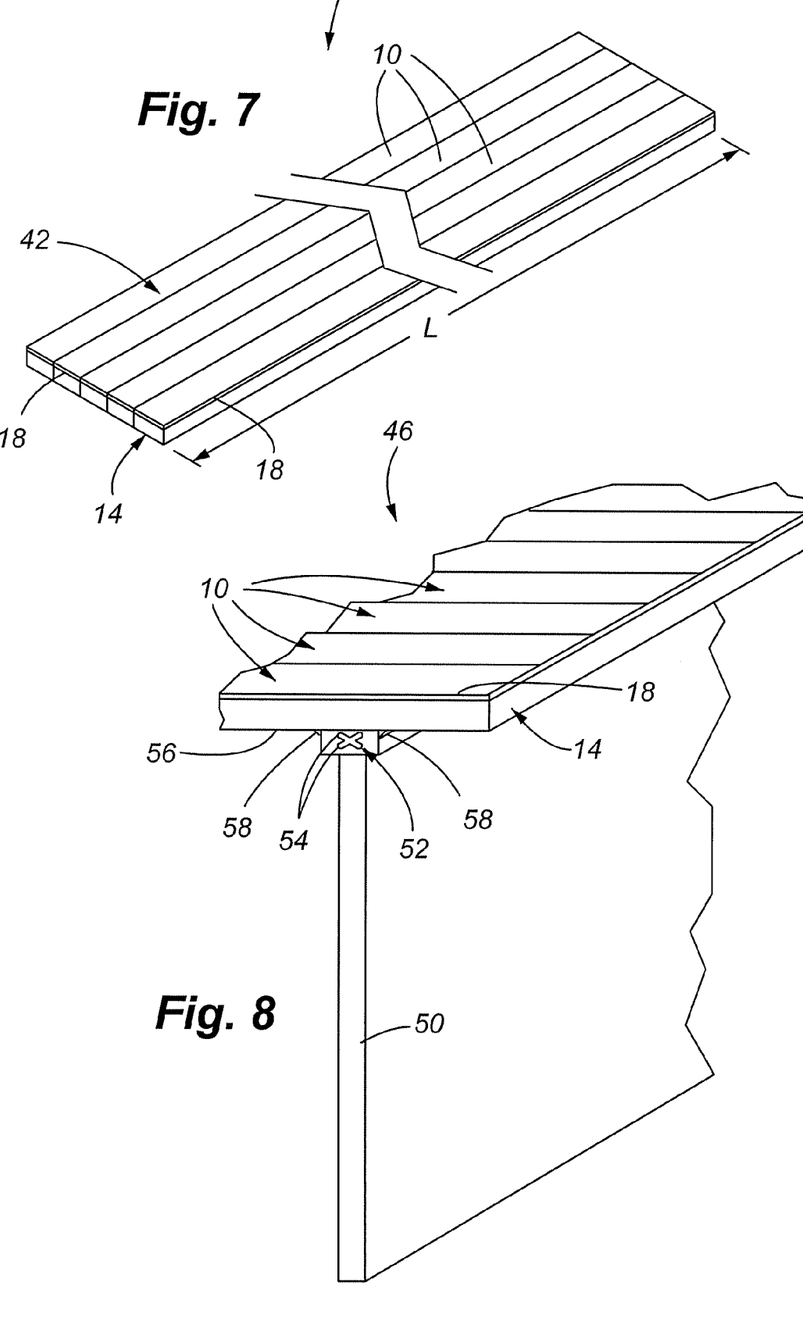
FIG. 7 is a perspective view of a portion of a boardwalk or deck in accordance with embodiments of the present invention.
FIG. 8 is a perspective view of a structural assembly in accordance with at least one embodiment of the present invention.

Referring now to FIG. 7, a portion of a boardwalk or deck 38 is shown, wherein the deck 38 includes a number of planks 10 (or 10', 100, 100') assembled to provide a walking surface 42. In at least one embodiment, the planks 10 (or 10', 100, 100') of the deck 38 are situated adjacent one another to form a substantially horizontal upper surface that can be traversed by a person walking.

Referring now to FIG. 8, and in accordance with embodiments of the present invention, a structural assembly 46 is shown that includes at least one plank 10 (or 10', 100, 100') interconnected to a support member 50. In a preferred embodiment, the support member 50 comprises a thermoplastic material, surrounding a reinforcing member 52 that comprises a plurality of lobes 54. Structural members described in U.S. Patent Application Publication No. 2006/0032182 (the content of which is incorporated herein by reference) are anticipated for use in structural assembly 46. A method of joining plank 10 (or 10', 100, 100') to support member 50 includes extrusion welding an underside 56 of plank 10 (or 10', 100, 100') to support member 50 using methods known to those skilled in the art, such as by running a bead of molten thermoplastic to form an extrusion weld 58 along the intersection between the support member 50 and the underside 56 of plank 10 (or 10', 100, 100').

Figure 9:
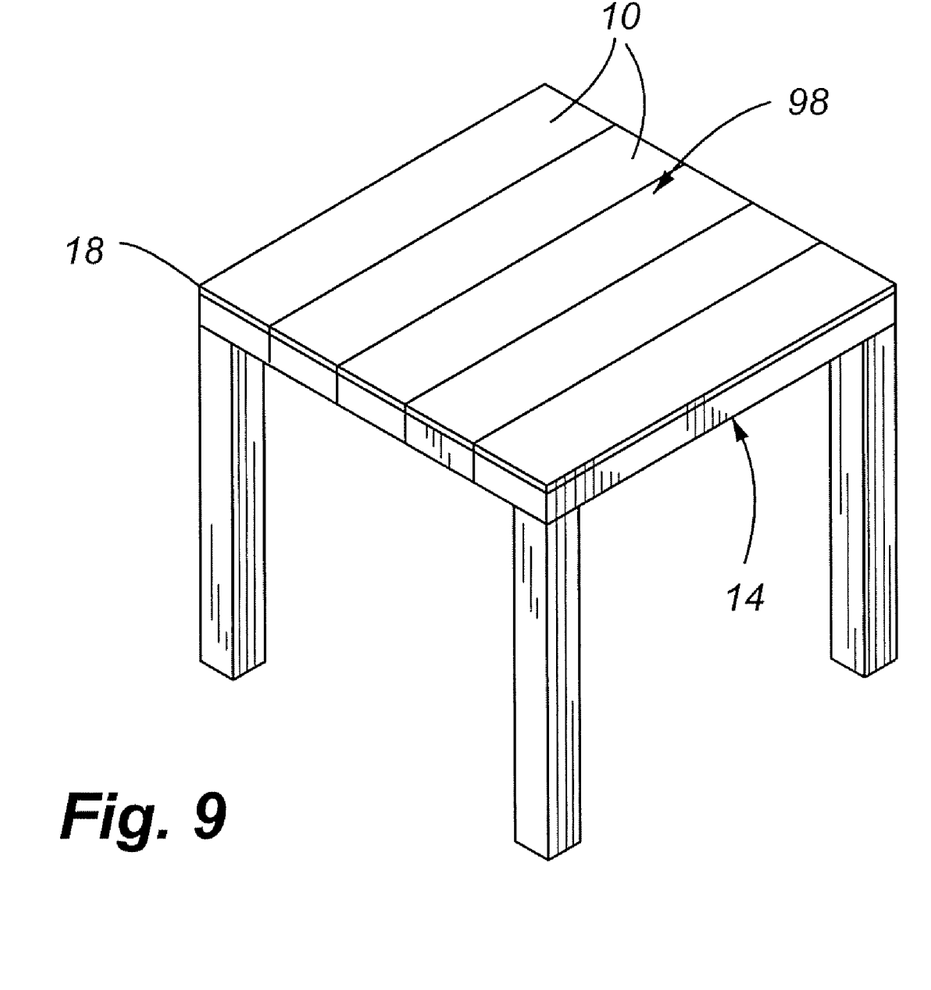
FIG. 9 is a perspective view of yet another application incorporating a structural member of the present invention.

Although some embodiments of the present invention are directed to planks for forming decking, other uses of the construction materials described herein are also within the scope of the invention, including using the material as a seating surface and/or arm rest surface, such as in hand railings, chairs, stadium seating, park benches, and outdoor bleachers. In addition, the material may be used in table tops and counter tops, such as picnic tables or deck furniture (FIG. 9 provides an illustration of a table 98 incorporating a structural member in accordance with the present invention). In addition, the material may be used for constructing outdoor play sets for children. In addition, the material may be used in theme or amusement park structures.

In at least one embodiment of the invention, a thin layer or skin of non-foamed thermoplastic material is placed as an outmost surface on the outer layer surface material 18. Such a layer may be manufactured as part of a three-part co-extrusion process used to cover the inner core, where the first extrusion portion of the three-part co-extrusion process is the outer core material directly surround the inner core, the second extrusion portion of the three-part co-extrusion process is the cushion layer on the top of the outer core material, and the third extrusion portion of the three-part co-extrusion process is skin layer over cushion layer.

Furthermore, it is to be understood that, although discussed as planking or decking material, planking 10, 10', 100, 100', a composite glass-plastic inner core 26, 68 (or a foamed glass-reinforced polyurethane) may be used in a variety of structural applications, such as subflooring, flooring, wall panels, etc. In addition, the material may be used and exterior siding for buildings.

The planking described herein may be manufactured in lengths and widths of standard dimensional materials, thus providing a material easily adapted for incorporation into construction applications. Alternatively, customized dimensions may also be manufactured for use of the material in various other applications, such as those noted above.

Referring again to FIG. 1, and by way of example and not limitation, plank 10 may have a plank width $W_P$ of between about 1 to 12 inches, with at least one nominal plank width $W_P$ of about 5.5 inches. Plank 10 may have a plank height $H_P$ of between about 0.5 to 3 inches, with at least one nominal plank height $H_P$ of about 1.5 inches. The inner core 26 may have an inner core wall thickness $T_{IC}$ of between about 0.05 inches and 0.25 inches, with at least one nominal inner core wall thickness $T_{IC}$ of about 0.125 inches; of course, if the inner core 26 is solid with no hollow portions, then the wall thickness is not applicable. The outer core 22 may have an outer core wall thickness $T_{OC}$ of between about 0.05 inches and 0.25 inches, with at least one nominal outer core wall thickness $T_{OC}$ of about 0.125 inches. Likewise, the exterior layer, wearing surface or surface material 18 may have a surface material thickness $T_{SM}$ of between about 0.075 inches and 0.25 inches, with at least one nominal surface material thickness $T_{SM}$ of about 0.125 inches. The inner core 26 may have an inner space height $H_{IS}$ of between about 0.2 inches and 1.25 inches, with at least one nominal inner space height $H_{IS}$ of about 0.75 inches. The inner core 26 may have an inner space width $W_{IS}$ of between about 0.5 inches and 11.5 inches, with at least one nominal inner space width $W_{IS}$ of about 4.5 inches.

Referring now to FIG. 2, and by way of example and not limitation, plank 10' may have a plank width $W_P'$ of between about 1 to 12 inches, with at least one nominal plank width $W_P'$ of about 5.5 inches. Plank 10' may have a plank height $H_P'$ of between about 0.5 to 3 inches, with at least one nominal plank height $H_P'$ of about 1.0 inch. The inner core 68 may have an inner core wall thickness $T_{IC}'$ of between about 0.03 inches and 0.25 inches, with at least one nominal inner core wall thickness $T_{IC}'$ of about 0.05 inches; of course, if the inner core 68 is solid with no hollow portions, then the wall thickness is not applicable. The outer core 64 may have an outer core wall thickness $T_{OC}'$ of between about 0.03 inches and 0.25 inches, with at least one nominal outer core wall thickness $T_{OC}'$ of about 0.05 inches. The wearing surface or surface material 18 may have a surface material thickness $T_{SM}$ of between about 0.075 inches and 0.25 inches, with at least one nominal surface material thickness $T_{SM}$ of about 0.125 inches. The inner core 68 may have an inner space height $H_{IS}'$ of between about 0.2 inches and 1.25 inches, with at least one nominal inner space height $H_{IS}'$ of about 0.275 inches. The inner core 68 may have an inner space width $W_{IS}'$ of between about 0.5 inches and 11.5 inches, with at least one nominal inner space width $W_{IS}'$ of about 4.5 inches.

All of the dimensions provided herein are for exemplary purposes and are not intended to be limiting. Other dimensions are possible, and such other dimensions are within the scope of the present invention.

The materials forming planking 10, 10', 100, 100' of the present invention preferably include non-toxic substances that resist weathering and microbial attack, and may be impregnated with one or more anti-microbial materials. More particularly, the planking 10, 10', 100, 100' itself may optionally include one or more anti-microbial and/or anti-fungal materials for preventing or limiting bacterial or fugal organisms from associating with the deck material.

The structural core 14, 60 of planks 10, 10', 100, 100' may comprise a variety of configurations and material types, including a plastic, metal, or composite material, and more particularly, a material such as steel, aluminum, an aluminum alloy, carbon fiber, glass-reinforced polyurethane, and combinations thereof. In addition, the materials used to make the planks 10, 10', 100, 100' may include recycled, natural, and synthetic materials.

Referring again to FIGS. 1 and 2, the inner core 26, 68 may comprise a metal, a metal alloy, steel, aluminum, an aluminum alloy, glass-reinforced polyurethane, carbon fiber, foamed and unfoamed glass-reinforced polyurethane, and combinations thereof. In at least one embodiment of the invention the inner core 26, 68 comprises a glass-reinforced polyvinyl-chloride (PVC) material. More particularly, and by way of example and not limitation, the inner core 26, 68 comprises a material made of 15-25% by weight glass, 0-25% by weight mica, with the remaining material comprising a thermoplastic material, such as PVC or PPE. Another example of one possible blend for the glass-reinforced polyurethane comprises 70% glass by weight and 30% polyurethane by weight. This blended material comprises the inner core of various planks as described herein, and for example, can serve as a substitute material for an aluminum alloy inner core.

In accordance with embodiments of the present invention, the inner core 26, 68 may optionally comprise surficial features to assist in the mechanical bonding of the surrounding resin with the exterior surface of the inner core 26, 68. By way of example and not limitation, the exterior surface of the reinforcing member or inner core 26, 68 may comprise one or more of a deboss and a surface texturing. More particularly, a deboss of the exterior surface of the inner core 26, 68 may comprise an indention in the exterior surface. The indentation may be formed, for example, by a mechanical tool impacting or pressing against the exterior surface of the inner core 26, 68 to cause the indentation, wherein the indentation causes a localized change in the planar surface of the exterior surface of the inner core 26, 68 in the vicinity of the indentation. The deboss is preferably a plurality of such indentations, wherein the deboss extends along at least a portion of the longitudinal length of the inner core 26, 68.

The thermoplastic of the outer core 22, 64 may include a resin, and more preferably, the outer core may be made of HDPE, PPE, another thermoplastic material, or a combination of materials. Thus, the outer core 22, 64 preferably comprises as a thermoplastic, and may or may not further include additives, such as talc and/or $Ca_2CO_3$ that acts as a both a filler and strengthening material or reinforcement (e.g., crushed limestone).

In at least one embodiment of the invention, an additive such as talc is added to the thermoplastic of the outer core to improve brittleness and/or modulus characteristics. Embodiments of the invention include 0 to 45 percent by weight talc, and more preferably, 20 to 40 percent by weight talc, and more preferably yet, 25 to 35 percent by weight talc, and still more preferably yet, 30 to 33 percent by weight talc.

As noted above, the inner core 26, 68 may comprise one or more perforations or apertures 94, such as within a saddle 72 if present, for allowing air (or gas) to flow into an inner space 70 of the inner core 26, 68 when the resin of the outer core 22, 64 is in a liquid or molten state as it is extruded or injected around all or a portion of the inner core 26, 68. Here, the perforations assist in preventing a build up of air (or gas) as an air pocket between the inner core 26, 68 and the outer core 22, 64, thereby improving the contact of the outer core 22, 64 with the inner core 26, 68. In addition, a vacuum may be applied to the inner space 70 of the inner core 26, 68 to remove air adjacent the exterior surface of the inner core 26, 68 as the outer core 22, 64 in its molten state is extruded or injected around the inner core 26, 68.

In accordance with embodiments of the present invention, where the inner core 26, 68 is made of a composite glass-plastic material, the composite glass-plastic material may be a continuous liquid glass (CLG) and polyurethane material. The CLG material has a liquid-like viscosity upon extrusion during the manufacturing process, but hardens as it cools. In at least one embodiment of the present invention, the CLG and polyurethane material is foamed during manufacture. In at least one embodiment of the present invention, the CLG and polyurethane material is not foamed during manufacture. In accordance with embodiments of the present invention, the composite glass-plastic of the inner core 26, 68 forms a chemical bond when co-extruded with the surrounding thermoplastic material of outer core 22, 64 so that the inner core 26, 68 remains integrally secured to the thermoplastic material that comprises the outer core 22, 64, even under loading conditions. In accordance with the various embodiments of the present invention, the thermoplastic material forming the outer core 22, 64 that at least partially surrounds the inner core 26, 68 comprises a polypropylene (PP), wherein the PP may further comprise one or more fillers such as calcium carbonate and/or talc. When co-extruded, the thermoplastic outer core 22, 64 with the CLG polyurethane the inner core 26, 68 demonstrates attractive engineering properties, such as a significant modulus of elasticity.

For inner core 26, 68 made of a composite glass-plastic material, portions of the inner core 26, 68 may be hollow, or alternatively, the inner core 26, 68 may be substantially solid and not contain any hollow areas (with the exception of voids associated with the foaming process, if a foamed CLG and polyurethane material is used). In yet another alternative, the hollow portions 30 or inner space 70 of the inner core 26, 68 may be filled with another material, such as a closed-cell foam. Although shown as rectangles, the inner core 26, 68 may be shaped differently, such as including a plurality of arms and/or saddle areas, lobes or other surface features, as shown and/or described in this detailed description.

Another aspect of the present invention comprises a manufacturing process for forming the planks 10, 10', 100, 100'. The planks 10, 10', 100, 100' may be made by injection molding, or more preferably, the planks 10, 10', 100, 100' may be made by an extrusion process. More particularly, a method of manufacture in accordance with an embodiment of the present invention comprises extruding the planks 10, 10', 100, 100'. In one preferable embodiment, a dual extrusion process is used wherein the inner core 26, 68 made of a metal alloy (e.g., aluminum alloy) or glass-reinforced polyurethane is extruded with a specified shape, cooled, prepared for receipt of the overlying resin (such as a thermoplastic, e.g., HDPE, PPE) that comprises the outer core 22, 64, and then the resin is extruded around the inner core 26, 68. For inner cores 26, 68 having a hollow portion 30, the resin may also optionally be extruded into all or a portion of the inner core 26, 68. The preferred manufacturing process is conducted as a continuous process, although a discontinuous process is also within the scope of the present invention.

A method of manufacturing a plank in accordance with embodiments of the present invention may include preparing the inner core, to include forming an aluminum alloy extrusion with a non-uniform surface, the surface extending a longitudinal length of at least L. The method may further include forming an aluminum alloy with a non-uniform surface that includes providing surface attributes that improve the bonding of the outer core made preferably of a thermoplastic (or thermoplastic composites, such as amended HDPE) to the inner core. Furthermore, the method may include preparing the inner core to include extruding the inner core and adjusting its temperature by cooling.

In accordance with another embodiment of the present invention, an illustrative method of manufacturing a plank includes: (a) preparing an inner core having at least a longitudinal length L for bonded integration to an outer core of substantially the longitudinal length L; (b) forming a plank by feeding the inner core into a thermoplastic extruder and extruding the thermoplastic outer core at least partially around the inner core, wherein the thermoplastic of the outer core is bonded to the surface of the inner core along substantially the longitudinal length L of the inner core. As described above, in one embodiment, a vacuum may be applied to the inner space 70 of the inner core 26, 68 to remove air (or gas) adjacent the exterior surface 96 of the inner core 26, 68 as the outer core 22, 64 is extruded or injected around the inner core 26, 68. The method may further comprise cooling the extrusion-formed plank in a controlled manner.

In at least one method of manufacturing planks or decking of the present invention, the reinforcing member or inner core is first manufactured, such as by extruding an aluminum alloy reinforcing member. The surrounding layer of thermoplastic material is then extruded around the reinforcing member. In addition, when extruding the outer layer of thermoplastic material around the reinforcing member, the thermofoamed layer is co-extruded to bond to the exterior of the outer layer of thermoplastic material. In accordance with at least one embodiment of the present invention, the foaming agents are added to the resin in the extrusion process.

In accordance with at least one embodiment of the present invention, to form the glass-reinforced polyurethane core material, liquid or molten glass is added to the tooling downstream of the extruded polyurethane to blend the two materials together. The glass-reinforced polyurethane may be entrained with air or otherwise foamed to provide a lighter material that still exhibits advantageous engineering properties. The glass-reinforced polyurethane is then fed through a die, such as a cross-head die, to the surrounding thermoplastic comprising, for example, HDPE or PP, with or without fillers of calcium carbonate or talc. Engineering property assessments have been made on this core, with values of 6.5-7.2 Mpsi modulus, simulating properties of aluminum. The glass-reinforced polyurethane core/reinforcing member material also offers advantages over other materials, such as a metal alloy reinforcing core. More particularly, mechanical bonding between the core material and the surrounding thermoplastic is less significant of an issue because bonding between the glass-reinforced polyurethane core and the surrounding thermoplastic is achieved sufficiently through chemical bonding between the two materials, that is, the inner core chemically bonds to the at least partially surrounding outer core made of a thermoplastic material.

Additional embodiments of the present invention are directed to one or more methods of manufacturing planking. In accordance with at least one embodiment of the present invention, sonic vibrations are used on the die that is used to extrude the planking. The sonic vibrations have been found to improve the throughput of the material through the die, such a by a factor of about 3.

In accordance with embodiments of the present invention, thermal control of the inner core may be performed while extruding the thermoplastic material of the outer core around the inner core. For the various embodiments of the present invention, the thermoplastic may comprise high density polyethylene (HDPE), polypropylene (PP) and/or other materials. Polypropylene typically exhibits less shrinkage/swell given temperature fluctuations following extrusion, and may be more beneficial for certain applications. Reinforcing fiber materials may or may not be used, and may comprise carbon fibers, fiberglass, wood fibers, and/or other types of fibers. In addition, foaming agents may or may not be used, and may be included for a portion of the thermoplastic to lighten the weight of the planking; however, the use of foaming agents in the thermoplastic material is preferably limited so as not to adversely affect the overall strength of the planking. Thus, to maintain strength, a balance is needed for the particular application to appropriately proportion the thickness of the dimensions of the inner core with any thermo-foaming used in the thermoplastic portions of the outer core of the planking.

By way of example and not limitation, for inner cores comprising a metal, such as steel, aluminum or an aluminum alloy, the inner core may be heated or cooled to improve bonding of the thermoplastic material of the outer core around the inner core. In addition, in at least one embodiment of the present invention, one or more streams of air or gas can be directed at one or more parts of the composite planking during manufacturing to prevent the thermoplastic material of the outer core from pulling away from the inner core. In at least one embodiment of the present invention, one or more streams of air or gas are thermally adjusted to promote controlled heating or cooling of the thermoplastic material against the inner core. In addition, in at least one embodiment of the invention, the die used to form portions of the planking are heated and/or cooled to control heating and/or cooling of the thermoplastic plastic material and/or inner core, thereby helping to control shrinkage and/or swelling of the thermoplastic material relative to the inner core. An air pocket may be used in certain areas during the manufacturing process to avoid contraction of the thermoplastic material away from the inner core. Thus, during one possible method of manufacture, as the inner core enters a die, such a cross-head thermoplastic extrusion die, the inner core may be either heated or cooled to assist in a more even cooling and distribution of the thermoplastic material around the inner core. The die itself may also be either heated or cooled to further assist in a more even cooling and distribution of the thermoplastic material around the inner core. In addition, sonic vibration of the inner core or the die may be applied to increase thermoplastic throughput, and thus increase overall production. In general, sonic vibration acts to keep the thermoplastic flowing and in liquid form and from reaching a solid condition prematurely. In addition, to assist even distribution of the thermoplastic in certain thicker sections, an air port providing air pressure may be added to assist in keeping the thermoplastic flow at more equal velocity and extend and maintain the contact with the inner core.

To assist in the understanding of the present invention the following list of components and associated numbering found in the drawings is provided herein:

| Component | Number/Symbol |
| --- | --- |
| Plank | 10 |
| Plank | 10' |
| Structural core | 14 |
| Surfacing material | 18 |
| Outer core | 22 |
| Inner core | 26 |
| Hollow portions | 30 |
| Post | 34 |
| Deck | 38 |
| Walking surface | 42 |
| Structural assembly | 46 |
| Support member | 50 |
| Reinforcing member | 52 |
| Lobes | 54 |
| Underside | 56 |
| Extrusion weld | 58 |
| Structural core | 60 |
| Outer core | 64 |
| Inner core | 68 |
| Inner space | 70 |
| Saddle | 72 |
| Neck portion | 76 |
| Saddle fill material | 78 |
| Base portion | 80 |
| Inner surface | 84 |
| Semicircular shape | 88 |
| Tapered sides | 92 |
| Apertures | 94 |
| Exterior surface | 96 |
| Table | 98 |
| Plank | 100 |
| Plank | 100' |
| Plank height | $H_P$ |
| Plank height | $H_P'$ |
| Inner space height | $H_{IS}$ |
| Inner space height | $H_{IS}'$ |
| Outer core wall thickness | $T_{OC}$ |
| Outer core wall thickness | $T_{OC}'$ |
| Inner core wall thickness | $T_{IC}$ |
| Inner core wall thickness | $T_{IC}'$ |
| Surface material thickness | $T_{SM}$ |
| Inner space width | $W_{IS}$ |
| Inner space width | $W_{IS}'$ |
| Plank width | $W_P$ |
| Plank width | $W_P'$ |
| Maximum base portion width | $W_{MBP}$ |
| Neck portion width | $W_{Neck}$ |
| Longitudinal length | L |

A number of variations and modifications of the invention can be used. It would be possible to provide for some features of the invention without providing others. For example, in one alternative embodiment, decking planks may include an integral interconnection mechanism for attachment to underlying framing. In another alternative embodiment, support members may utilize aspects of the present invention to provide aesthetically pleasing exposed surfaces, such as the underside, edges or sides of decking that can be seen from a lower elevation.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description Of The Invention for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description Of The Invention, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights that include alternative embodiments to the extent permitted, including alternate, interchangeable and/or equivalent structures, functions, ranges or steps to those claimed.

What is claimed is:

1. A lightweight plank suitable for use as a building element comprising:
   an aluminum alloy inner structural core constructed from a solid aluminum alloy sheet that is shaped to provide a hollow inner space;
   a plurality of saddles formed in said solid aluminum alloy sheet that protrude inwardly into said inner space, said saddles having a neck and a base, said neck having a neck width that is less than a maximum base width of said base;
   a thermoplastic outer core that is extruded over an outer surface of said solid aluminum alloy sheet, said thermoplastic outer core substantially filling said base of said saddles so that said saddles mechanically secure said thermoplastic outer core to said solid aluminum alloy sheet, said thermoplastic outer core substantially surrounding said aluminum alloy sheet to provide a protective layer that protects said solid aluminum alloy inner structural core.

2. The plank of claim 1 further comprising:
   apertures formed in at least one of said plurality of saddles so that said thermoplastic outer core flows through said apertures and is mechanically held to said at least one of said plurality of saddles.

3. The plank of claim 1 further comprising:
   a thermoplastic surface layer disposed on an outer surface of said thermoplastic outer core.

4. The plank of claim 3 wherein said thermoplastic surface layer is a color that substantially reflects sunlight so that said plank is resistive to excessive heating.

5. The plank of claim 3 further comprising:
   a skin layer that is extruded over said thermoplastic surface layer.

6. The plank of claim 4 wherein said thermoplastic surface layer is co-extruded with said thermoplastic outer core.

7. The plank of claim 5 wherein said thermoplastic outer core, said thermoplastic outer layer and said skin layer are co-extruded.

8. The plank of claim 5 wherein said skin layer is a color that substantially reflects sunlight so that said plank is resistive to excess heating.

9. The plank of claim 6 wherein said thermoplastic surface layer comprises a foamed thermoplastic layer that is light in weight and provides cushioning to said outer surface of said plank.

10. The plank of claim 6 wherein said thermoplastic surface layer further comprises microspheres disposed within said thermoplastic surface layer.

11. The plank of claim 9 wherein said thermoplastic outer core further comprises talc disposed in said thermoplastic outer core that increases loading strength of said thermoplastic outer core.

12. The plank of claim 1 wherein said thermoplastic outer core is formed from a first layer that is extruded into said saddles and a second layer that is extruded over said outer surface of said solid aluminum alloy sheet and said first layer so that said first layer and said second layer form a single integral layer.

13. The plank of claim 1 wherein said plank is a building element in a deck surface.

14. The plank of claim 1 wherein said plank is a building element in furniture.

15. The plank of claim 1 wherein said plank is a building element for outdoor playsets for children.

16. The plank of claim 9 wherein said thermoplastic surface layer includes anti-microbial materials.

17. A method of making a lightweight plank for use as a building element comprising:
   providing an aluminum alloy inner structural core constructed from a solid aluminum alloy sheet that is shaped to provide a hollow inner space;
   providing a plurality of saddles in said solid aluminum alloy sheet that protrude inwardly into said hollow inner space of said aluminum alloy structural core, said saddles having a neck and a base, said neck having a neck width that is less than a maximum base width of said base of said saddles;
   extruding a thermoplastic outer core over an outer surface of said solid aluminum alloy sheet, said thermoplastic outer core substantially filling said base of said saddle so that said saddle mechanically secures said thermoplastic outer core to said solid aluminum alloy sheet, said thermoplastic outer core substantially surrounding said aluminum alloy sheet to protect said aluminum alloy sheet.

18. The method of claim 17 wherein said process of extruding said thermoplastic outer core over said outer surface of said solid aluminum alloy sheet further comprises:
   extruding said thermoplastic outer core through apertures formed in said saddle to further mechanically secure said thermoplastic outer core to said solid aluminum alloy sheet.

19. The method of claim 17 further comprising:
   extruding a thermoplastic surface layer on said thermoplastic outer core.

20. The method of claim 19 further comprising:
   extruding a thermoplastic skin layer over said thermoplastic surface layer.

21. The method of claim 20 wherein said thermoplastic outer core, said thermoplastic surface layer and said thermoplastic skin layer are co-extruded.

22. The method of claim 21 wherein a foaming agent is added to said thermoplastic surface layer to decrease weight and provide cushioning to said thermoplastic surface layer.

23. The method of claim 22 wherein said process of extruding said thermoplastic outer core comprises:
   extruding a first layer of said thermoplastic outer core in said saddles;
   extruding a second layer of said thermoplastic outer core over said first layer and said outer surface of said aluminum alloy sheet.

* * * * *